United States Patent
Yi

(10) Patent No.: US 12,323,353 B2
(45) Date of Patent: Jun. 3, 2025

(54) METHOD FOR CONTROLLING RADIO FREQUENCY FRONT-END DEVICE AND USER EQUIPMENT

(71) Applicant: VIVO MOBILE COMMUNICATION CO., LTD., Guangdong (CN)

(72) Inventor: Wei Yi, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 266 days.

(21) Appl. No.: 17/988,923

(22) Filed: Nov. 17, 2022

(65) Prior Publication Data
US 2023/0079798 A1 Mar. 16, 2023

Related U.S. Application Data

(63) Continuation of application No. PCT/CN2021/095479, filed on May 24, 2021.

(30) Foreign Application Priority Data

May 28, 2020 (CN) .......................... 202010465907.0

(51) Int. Cl.
*H04L 5/00* (2006.01)
*H04W 72/0453* (2023.01)

(52) U.S. Cl.
CPC ....... *H04L 5/0048* (2013.01); *H04W 72/0453* (2013.01)

(58) Field of Classification Search
CPC ............... H04L 5/0048; H04L 5/0051; H04W 72/0453; H04W 72/0446; H04B 1/44; H04B 1/40; Y02D 30/70; H03K 17/28
See application file for complete search history.

(56) References Cited

U.S. PATENT DOCUMENTS

2003/0032403 A1* 2/2003 Ono ..................... H04B 7/0814
  455/135
2006/0291119 A1* 12/2006 Wang ..................... H01H 47/32
  361/93.1
(Continued)

FOREIGN PATENT DOCUMENTS

CN    103812486 A    5/2014
CN    108292940 A    7/2018
(Continued)

OTHER PUBLICATIONS

Ericsson "Details on SRS design" 3GPP TSG-RAN WG1 #90bis, Prague, Czech Republic, Oct. 9-13, 2017, pp. 14.
(Continued)

*Primary Examiner* — Sun Jong Kim
(74) *Attorney, Agent, or Firm* — Fredrikson & Byron, P.A.

(57) ABSTRACT

The present application relates to the field of communications technologies, and provides a method for controlling a radio frequency front-end device and user equipment, where the user equipment includes a processor and the radio frequency front-end device, and the method includes: receiving, by the radio frequency front-end device, a switch control instruction from the processor, where the switch control instruction is an instruction sent by the processor to the radio frequency front-end device at a first moment; and performing, by the radio frequency front-end device, on-off switching in response to the switch control instruction.

12 Claims, 3 Drawing Sheets

(56) References Cited

U.S. PATENT DOCUMENTS

| | | | |
|---|---|---|---|
| 2011/0142263 A1 | 6/2011 | Sun | |
| 2019/0261205 A1 | 8/2019 | Van Der Ham et al. | |
| 2019/0288732 A1 | 9/2019 | Bai | |
| 2020/0382250 A1* | 12/2020 | Choi | H04L 5/0048 |
| 2021/0226821 A1* | 7/2021 | Liu | H04L 5/0091 |
| 2023/0047048 A1* | 2/2023 | Liu | H04B 7/0417 |

FOREIGN PATENT DOCUMENTS

| | | |
|---|---|---|
| CN | 108377143 A | 8/2018 |
| CN | 108599779 A | 9/2018 |
| CN | 108768599 A | 11/2018 |
| CN | 108880768 A | 11/2018 |
| CN | 109217895 A | 1/2019 |
| CN | 110324906 A | 10/2019 |
| CN | 110474734 A | 11/2019 |
| CN | 110535581 A | 12/2019 |
| CN | 111201746 A | 5/2020 |
| KR | 1020200014794 A | 2/2020 |
| WO | 2019103560 A1 | 5/2019 |

OTHER PUBLICATIONS

European Patent Office "Extended European Search Report" From application No. 21813093.8, Dated Oct. 20, 2023, pp. 9.

International Patent Application No. PCT/CN2021/095479, International Search Report and Written Opinion with Partial English Machine Translation mailed Aug. 13, 2021, 9 pages.

\* cited by examiner

METHOD FOR CONTROLLING RADIO FREQUENCY FRONT-END DEVICE AND USER EQUIPMENT

CROSS-REFERENCE TO RELATED APPLICATIONS

The present application is a continuation of International Application No. PCT/CN2021/095479, filed on May 24, 2021, which claims priority to Chinese Patent Application No. 202010465907.0 filed in China on May 28, 2020, which is incorporated herein by reference in its entirety.

TECHNICAL FIELD

The present application relates to the field of communications technologies, and in particular, to a method for controlling a radio frequency front-end device and user equipment.

BACKGROUND

In the current radio frequency communications system, a control logic of the radio frequency device is usually controlled by the mobile industry processor interface (MIPI). The RF front-end (RFFE) control interface protocol is a protocol for the radio frequency (RF) device in the MIPI protocol. According to the RFFE protocol, a pair of RFFE control lines can control a plurality of devices in line with the RFFE protocol, which saves hardware resources, so that the RFFE protocol has been widely applied to the RF hardware design.

A basic operation process of the RFFE protocol is as follows: the RFFE controller sends a sequence start condition (SSC), identifies a device to be read and written through the user service identification (USID), and then writes data and a command to a register of a specified device. According to the RFFE protocol, when all commands and data are sent, the command in the register is executed after the RFFE issues an execution control command. However, the RFFE protocol is used for addressing and data read/write through sending serial data, and each data occupies a different duration. When the instruction needs to be controlled by sending a series of data, the requirement on the response time of the radio frequency front-end device is very high, which leads to the limitation of device type selection.

SUMMARY

According to a first aspect of the present application, a method for controlling a radio frequency front-end device, applied to user equipment, is provided, where the user equipment includes a processor and the radio frequency front-end device, and the method includes:
receiving, by the radio frequency front-end device, a switch control instruction from the processor, where the switch control instruction is an instruction sent by the processor to the radio frequency front-end device at a first moment; and
performing, by the radio frequency front-end device, on-off switching in response to the switch control instruction, where
the first moment is a moment before a first time interval in a target subframe, and the first time interval is used to send a sounding reference signal (Sounding Reference Signal, SRS).

According to a second aspect of the present application, user equipment is provided, where the user equipment includes a processor and a radio frequency front-end device, and the radio frequency front-end device includes:
a receiving module, configured to receive a switch control instruction from the processor, where the switch control instruction is an instruction sent by the processor to the radio frequency front-end device at a first moment; and
a switch module, configured to perform on-off switching in response to the switch control instruction, where
the first moment is a moment before a first time interval in a target subframe, and the first time interval is used to send an SRS.

According to a third aspect of the present application, user equipment is provided, where the user equipment includes a processor, a memory, and a program or an instruction stored in the memory and executable on the processor, and when the program or the instruction is executed by the processor, steps of the method according to the first aspect are implemented.

According to a fourth aspect of the present application, a readable storage medium is provided, where the readable storage medium stores a program or an instruction, and when the program or the instruction is executed by a processor, steps of the method according to the first aspect are implemented.

According to a fifth aspect of the present application, a chip is provided, where the chip includes a processor and a communications interface, the communications interface is coupled to the processor, and the processor is configured to run a program or an instruction, to implement the method according to the first aspect.

According to a sixth aspect of the present application, a computer software product is provided, where the computer software product is stored in a non-volatile storage medium, and the software product is configured to be executed by at least one processor to implement steps of the method according to the first aspect.

According to a seventh aspect of the present application, user equipment is provided, and the user equipment is configured to perform the method according to the first aspect.

DESCRIPTION OF EMBODIMENTS

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

The terms "first", "second", and the like in this specification and claims of the present application are used to distinguish between similar objects instead of describing a specific order or sequence. It should be understood that the data used in this way is interchangeable in appropriate circumstances, so that the embodiments of the present application can be implemented in other orders than the order illustrated or described herein. In addition, objects distinguished by "first", "second", and the like usually belong to one type, and the number of the objects is not limited. For example, there may be one or more first objects. In addition, "and/or" in the specification and claims represents at least one of connected objects, and the character "I" usually indicates that associated objects are in an "or" relationship.

Figure 1:
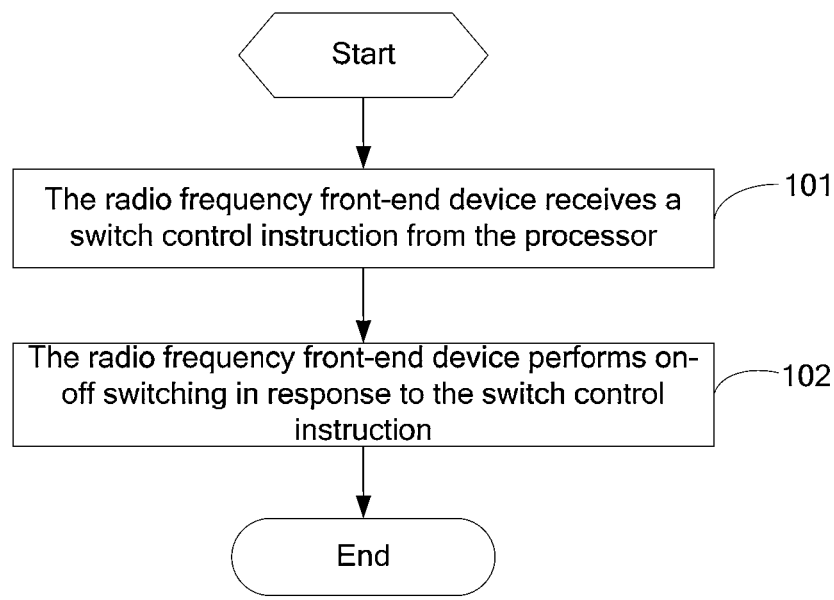
FIG. 1 is a flowchart of a method for controlling a radio frequency front-end device according to an embodiment of the present application.

Referring to FIG. 1, FIG. 1 is a flowchart of a method for controlling a radio frequency front-end device according to an embodiment of the present application. As shown in FIG. 1, the method includes the following steps.

Step 101. The radio frequency front-end device receives a switch control instruction from the processor, where the switch control instruction is an instruction sent by the processor to the radio frequency front-end device at a first moment.

The switch control instruction may include a common instruction and a trigger instruction. The common instruction is used to write a command and data of an operation to be performed by the radio frequency front-end device in a register of the radio frequency front-end device. For example, the operation to be performed by the radio frequency front-end device may be on-off switching for conducting different antennas and radio frequency transceivers. After the common instruction is sent, the processor may send the trigger instruction to the radio frequency front-end device, and the radio frequency front-end device may perform on-off switching after receiving the trigger instruction.

It should be noted that, as an optional implementation, the radio frequency front-end device may send feedback information to the processor after receiving the common instruction; as another optional implementation, the processor may also send the trigger instruction to the radio frequency front-end device after sending the common instruction to the radio frequency front-end device for a preset duration.

In addition, it should be noted that the preset duration may be corresponding to the command and data of the operation to be performed by the radio frequency front-end device.

Step 102. The radio frequency front-end device performs on-off switching in response to the switch control instruction.

The first moment is a moment before a first time interval in a target subframe, and the first time interval is used to send an SRS.

It should be noted that the radio frequency front-end device should support the SRS function and enable the foregoing function to implement the function of sending the SRS.

The target subframe may include a first time interval and a second time interval, the second time interval may be before the first time interval, and the first time interval is used to send an SRS. Optionally, the second time interval is used to transfer resources through the physical uplink shared channel (Physical Uplink Shared Channel, PUSCH). It should be noted that both the SRS and the resource transfer through the PUSCH are interactions between the user equipment and the base station. The foregoing interaction may be completed between the user equipment and the base station through the radio frequency device, and the foregoing radio frequency device and the radio frequency front-end device in this embodiment may be different devices. Certainly, the foregoing radio frequency device and the radio frequency front-end device in this embodiment may be a same device. This is not specifically limited herein.

In addition, the second time interval and the first time interval may be adjacent time periods. Certainly, the second time interval and the first time interval may also be two time periods with time intervals. This is not specifically limited herein.

It should be noted that, for a working principle of this embodiment of the present application, refer to the following descriptions.

The processor sends the switch control instruction to the radio frequency front-end device at the first moment, and the radio frequency front-end device receives the switch control instruction at the second moment. In this way, a corresponding duration between the first moment and the second moment may be the first duration. However, the radio frequency front-end device receives the switch control instruction at the second moment, and performs on-off switching in response to the switch control instruction. The time taken to complete the switching may be the second duration.

According to the requirements of the 3rd Generation Partnership Project (3rd Generation Partnership Project, 3GPP), a sum of the first duration and the second duration should be less than a target threshold, and the target threshold is usually 10 microseconds. When both the first moment and the second moment are within a time period corresponding to the first time interval, and there is little difference in first durations for different types of radio frequency front-end devices, for example, it is usually greater than 5 microseconds, a range of the second duration is relatively small, which leads to very strict requirements on the radio frequency front-end device and a limited space for device type selection.

In this embodiment of the present application, the first moment is a moment before the first time interval in the target subframe, that is, the moment when the processor sends the switch control instruction is moved forward to the moment before the first time interval, so that the second moment is also moved forward accordingly. In this way, a sufficient duration may be reserved for the second duration in the time period corresponding to the first time interval. This reduces a proportion of the response time of the radio frequency front-end device in the first time interval for sending the SRS, so that more time is used for sending the SRS, and reduces the requirements on the response time of the radio frequency device.

It should be noted that the first duration may be referred to as an instruction execution time, and the second duration may be referred to as a device response time.

Optionally, that the radio frequency front-end device receives a switch control instruction from the processor is further:

receiving, by the radio frequency front-end device, the switch control instruction from the processor at a second moment, where the second moment is within the first time interval. In this way, after the switch control instruction is received at the second moment, the on-off switching may be performed, thus enhancing the flexibility of the radio frequency front-end device in on-off switching. In addition, since the second moment is within the first time interval, the time of performing the on-off switching by the radio frequency front-end device can be more accurately determined to avoid affecting the normal operation of other channels due to the on-off switching.

A specific moment corresponding to the second moment in the first time interval is not limited herein. For example, as an optional implementation, the second moment is a start moment corresponding to the first time interval. In this way, the proportion of the device response time in the first time interval may be further reduced, which further reduces the requirements on the response time of the radio frequency device.

As another optional implementation, the second moment is a moment between a middle moment and a start moment corresponding to the first time interval. In this way, the flexibility of the second moment corresponding to the first time interval is enhanced.

It should be noted that the closer the second moment is to the start moment of the first time interval, the better.

Optionally, the target subframe includes M time-domain symbols, and the first time interval occupies N time-domain symbols in the M time-domain symbols;
the target subframe further includes P time-domain symbols, and the P time-domain symbols are located before the first time interval; Q time-domain symbols are included in a time period between the first moment and the start moment of the first time interval, M, N, P, and Q are all positive integers, and M≥N+P+Q; and
the user equipment further includes a counter, the switch control instruction is an instruction that the processor sends to the radio frequency front-end device at the first moment after receiving a target message sent by the counter, and the target message is used to indicate that the counter starts counting at a start moment of the target subframe and completes counting of P−Q time domain symbols. The counter may be electrically or communicatively connected to the processor.

In this way, in this embodiment of the present application, time domain symbols are counted by using the counter, and after counting of P−Q time domain symbols is completed, the processor may send the switch control instruction to the radio frequency front-end device. Therefore, the accuracy of time domain symbol counting is enhanced, and it is avoided that the switch control instruction is sent too early or too late due to inaccurate counting.

In addition, the counter may be turned off before counting from the start of the target subframe, and may be turned on only after receiving the control instruction from the processor, and count from the start moment of the target subframe. In this way, the energy consumption may be reduced.

Optionally, the radio frequency front-end device includes L types of devices, and L is a positive integer; and
the first moment is determined based on a target response duration, the target response duration is a longest response duration in the L response durations, and the L response durations are durations respectively required for the L types of devices to perform on-off switching.

In this way, since the first moment is determined based on the longest target response duration in the L response durations, it can be ensured that each radio frequency front-end device may complete the on-off switching within the first time interval, that is, functions of each radio frequency front-end device may be realized normally.

At least two types of radio frequency front-end devices can be configured in the user equipment, and different types of radio frequency front-end devices have different response durations.

As an optional implementation, the response duration of each type of radio frequency front-end device may be pre-stored in the user equipment and may be obtained by the processor.

Certainly, as another optional implementation, the response duration may also be measured in advance. For example, the processor may separately send the switch control instruction to each radio frequency front-end device, and then count the duration from the moment when the processor sends the switch control instruction to the moment when each radio frequency front-end device completes the on-off switching. The duration is the response duration corresponding to each radio frequency front-end device. Different radio frequency front-end devices may have different response durations.

In addition, the processor may also measure the response duration of each radio frequency front-end device every preset period, and then correct the first moment based on the measurement result.

For example, when the measurement result shows that the longest target response duration in at least two radio frequency front-end devices is longer than the target response duration before the measurement, the target response duration obtained after the measurement may be determined as the corrected target response duration.

The following illustrates how to determine the first moment based on the target response duration. For example, the user equipment includes a first radio frequency front-end device and a second radio frequency front-end device, and a response duration of the first radio frequency front-end device is 4 microseconds, and a response duration of the second radio frequency front-end device is 5 microseconds. Then the target response duration may be determined as 5 microseconds. According to the foregoing implementations, the target threshold is usually 10 microseconds. When the second moment is a start moment of the first time interval, it may be determined that the first moment is 5 microseconds before the first time interval (that is, a difference between the target threshold and the target response duration). Certainly, the foregoing is only an example, and specific values of the target response duration and the target threshold are not limited herein.

In addition, in this embodiment of the present application, both the first moment and the second moment may be determined by counting of a counter unit set in the user equipment.

In this embodiment of the present application, the foregoing method for controlling a radio frequency front-end device may be applied to user equipment, such as a mobile phone, a tablet personal computer (Tablet Personal Computer), a laptop computer (Laptop Computer), a personal digital assistant (personal digital assistant, PDA), a mobile Internet device (Mobile Internet Device, MID), or a wearable device (Wearable Device).

In this embodiment of the present application, the radio frequency front-end device receives a switch control instruction from the processor, where the switch control instruction is an instruction sent by the processor to the radio frequency front-end device at a first moment; and the radio frequency front-end device performs on-off switching in response to the switch control instruction, where the first moment is a moment before a first time interval in a target subframe, and the first time interval is used to send an SRS. In this way, because the processor sends the switch control instruction to the radio frequency front-end device at the first moment, and the first moment is a moment before the first time interval in the target subframe, while the first time interval is used to send an SRS, a proportion of the response time of the radio frequency front-end device in the first time interval for sending the SRS may be reduced, more time is used for sending the SRS, and the requirements on the response time of the radio frequency device are reduced.

Figure 2:
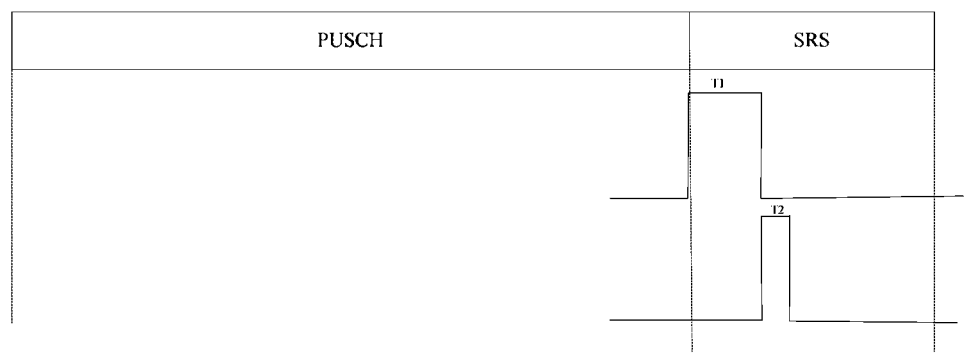
FIG. 2 is a first schematic diagram of an example according to an embodiment of the present application.

The following descriptions are provided with reference to a specific embodiment:

Referring to FIG. 2, when both the first moment and the second moment are within the first time interval, a first duration in which the switch control instruction is sent may be referred to as a T1; and a second duration in which the radio frequency front-end device completes on-off switching may be referred to as a T2.

Figure 3:
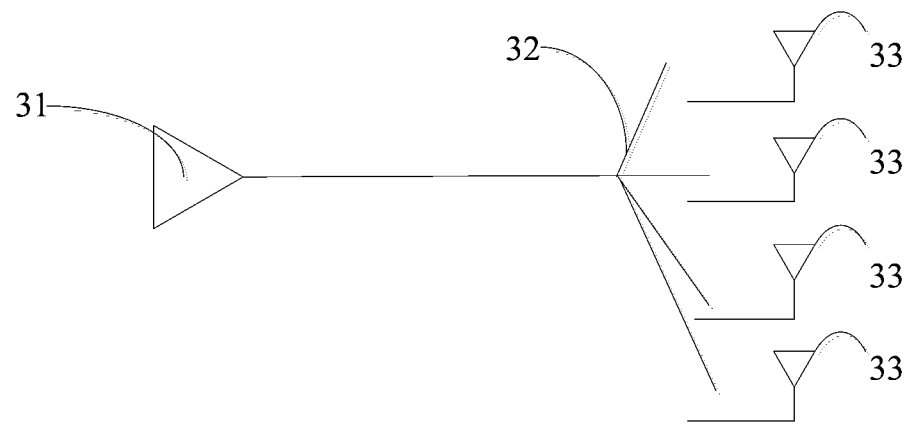
FIG. 3 is a schematic diagram of an application scenario according to an embodiment of the present application.

It should be noted that this embodiment may be applied to the 1T4R, and for a typical hardware architecture of the 1T4R, refer to FIG. 3, that is, switching of four antennas may be realized on this architecture. The power amplifier 31 is a transmit end, and the four antennas 33 may be an ANT 1, an ANT 2, an ANT 3, and an ANT 4 from top to bottom. Between the antenna 33 and the power amplifier 31 is a radio frequency front-end (RF Front-End, RFFE) or a radio frequency switch 32, which may be switched among the foregoing four antennas. Certainly, the power amplifier may also be referred to as a PA.

According to the requirements of 3GPP SRS slot control, the radio frequency front-end device (namely, the radio frequency switch) in this architecture needs to complete the transmit on-off process and the transmit off-on process within 10 microseconds. Otherwise, the throughput may decrease and the reliability of the radio frequency switch may easily decrease.

In this embodiment, a typical radio frequency switch device is used as an example. The second duration for the radio frequency front-end device to complete the on-off switching may be understood as a time corresponding to a switching speed of the antenna (that is, a time when the radio frequency signal is turned on from 10% to 90% or turned off from 90% to 10%). This time can usually be 2 microseconds.

In addition, in this embodiment, a mobile industry processor interface (Mobile Industry Processor Interface, MIPI) may be used to send a switch control instruction to the radio frequency switch.

That is, it should be controlled that T1+T2≤10 us at this time, where T1: an execution time of the MIPI sending the instruction (for example, it may be greater than 5 us); T2: an action time of the radio frequency front-end device (for example, the switch action time in the foregoing case, that is, the time corresponding to the switching speed).

As to the execution time of the MIPI sending the instruction, there is little difference in different radio frequency front-end devices, but limited by the 10 us requirement of 3GPP, T2=10 us−T1. T2 has very strict requirements on the radio frequency front-end device, and space for device type selection of the radio frequency front-end devices is limited.

Figure 4:
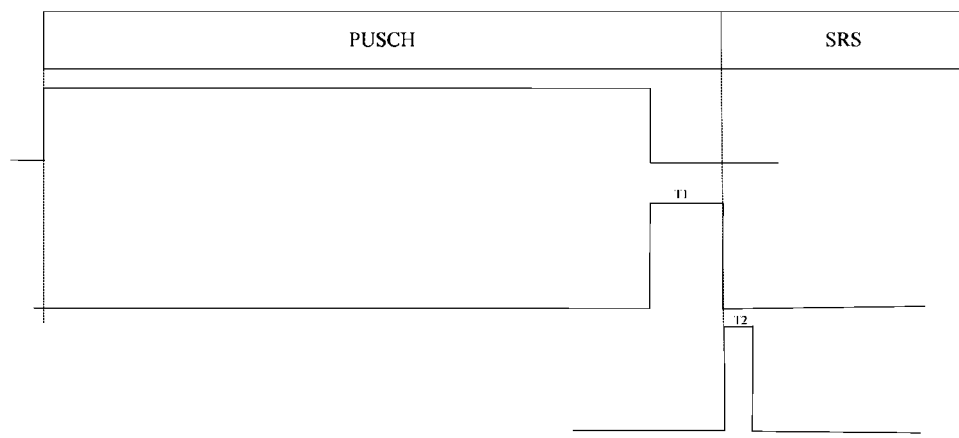
FIG. 4 is a second schematic diagram of an example according to an embodiment of the present application.

In this embodiment, referring to FIG. 4, the first moment is controlled to be located before the first time interval (namely, within the time period when the PUSCH is used to transmit resources), and the second moment is within the first time interval, so that the time of T1 is completed in one symbol before the SRS corresponding to the target subframe. In this way, the time of SRS T2 is not limited to T1, and only the following requirement needs to be satisfied: T2≤10 us. T2: an action time of the radio frequency front-end device (for example, the switch action time in the foregoing case, that is, the time corresponding to the switching speed). This greatly reduces the requirements of the radio frequency front-end device, provided that the switching speed in the corresponding device type selection is less than 10 us required in 3GPP. In the design and implementation, the electronic hardware does not need to add additional circuits, and is only implemented in the algorithm.

Figure 5:
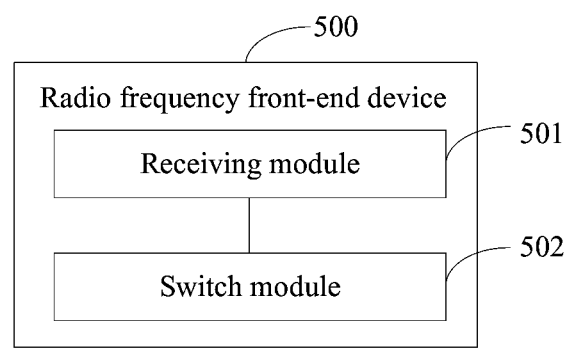
FIG. 5 is a structural diagram of a radio frequency front-end device according to an embodiment of the present application.

It should be noted that the user equipment includes a processor and a radio frequency front-end device. Referring to FIG. 5, FIG. 5 is a structural diagram of a radio frequency front-end device according to an embodiment of the present application. As shown in FIG. 5, the radio frequency front-end device 500 includes:

a receiving module 501, configured to receive a switch control instruction from the processor, where the switch control instruction is an instruction sent by the processor to the radio frequency front-end device at a first moment; and a switch module 502, configured to perform on-off switching in response to the switch control instruction, where the first moment is a moment before a first time interval in a target subframe, and the first time interval is used to send an SRS.

Optionally, the receiving module 501 is further configured to receive the switch control instruction from the processor at a second moment, where the second moment is within the first time interval.

Optionally, the second moment is a start moment corresponding to the first time interval.

Optionally, the target subframe includes M time-domain symbols, and the first time interval occupies N time-domain symbols in the M time-domain symbols;

the target subframe further includes P time-domain symbols, and the P time-domain symbols are located before the first time interval; Q time-domain symbols are included in a time period between the first moment and the start moment of the first time interval, M, N, P, and Q are all positive integers, and M≥N+P+Q; and the user equipment further includes a counter, the switch control instruction is an instruction that the processor sends to the radio frequency front-end device at the first moment after receiving a target message sent by the counter, and the target message is used to indicate that the counter starts counting at a start moment of the target subframe and completes counting of P−Q time domain symbols.

Optionally, the radio frequency front-end device 500 includes L types of devices, and L is a positive integer; and the first moment is determined based on a target response duration, the target response duration is a longest response duration in the L response durations, and the L response durations are durations respectively required for the L types of devices to perform on-off switching.

According to the radio frequency front-end device 500 in the embodiments of the present application, because the processor sends the switch control instruction to the radio frequency front-end device at the first moment, and the first moment is a moment before the first time interval in the target subframe, while the first time interval is used to send an SRS, a proportion of the response time of the radio frequency front-end device in the first time interval for sending the SRS may be reduced, more time is used for sending the SRS, and the requirements on the response time of the radio frequency device are reduced.

Figure 6:
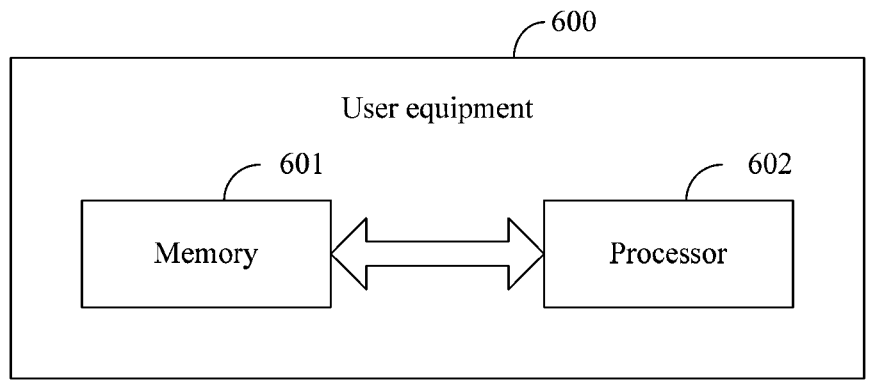
FIG. 6 is a first structural diagram of user equipment according to an embodiment of the present application.

Optionally, as shown in FIG. 6, an embodiment of the present application further provides user equipment 600, including a processor 601, a memory 602, a radio frequency front-end device, and a program or an instruction stored in the memory 602 and executable on the processor 601. When the program or the instruction is executed by the processor 601, the processes of the method embodiment for controlling a radio frequency front-end device are implemented and a same technical effect can be achieved. To avoid repetition, details are not described herein again.

It should be noted that the user equipment in this embodiment of the present application includes the mobile user equipment and the non-mobile user equipment described above.

Figure 7:
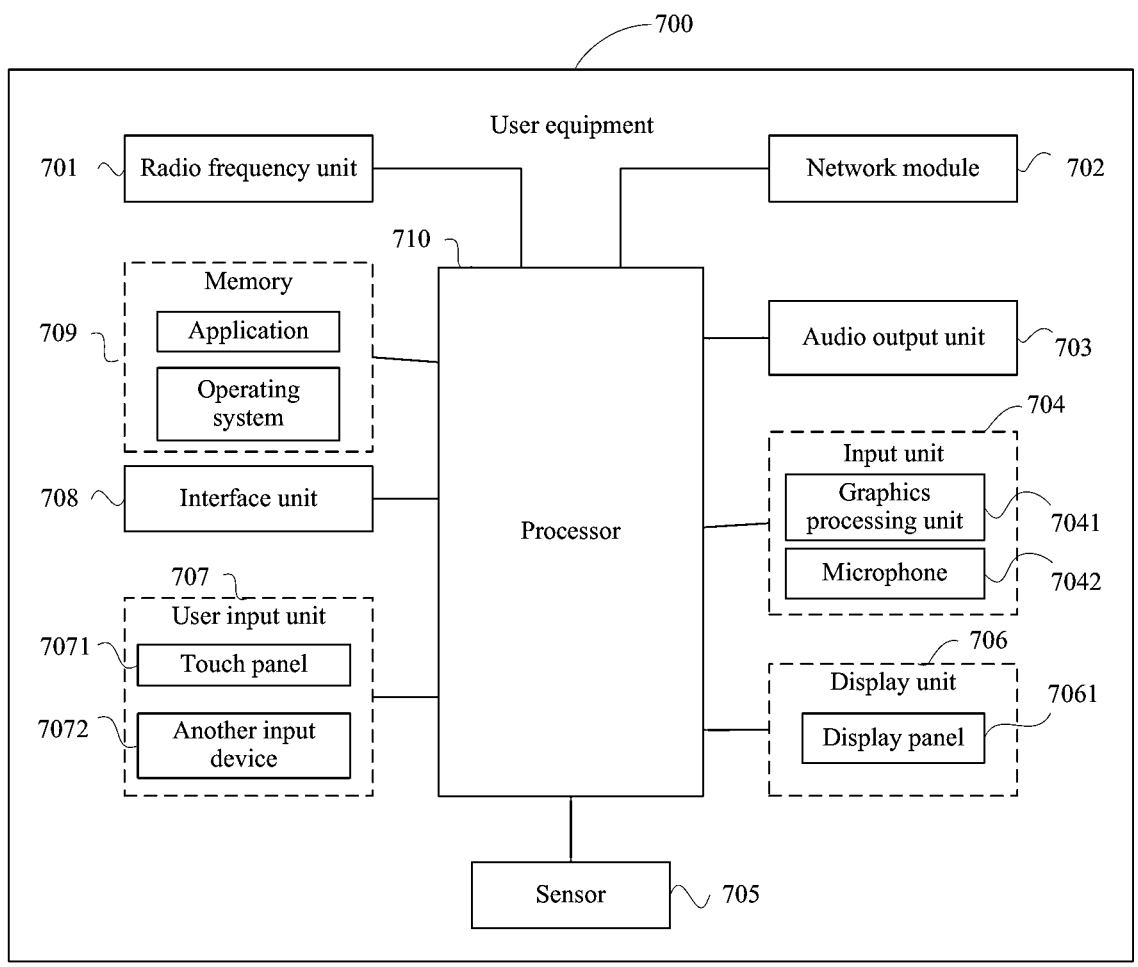
FIG. 7 is a second structural diagram of user equipment according to an embodiment of the present application.

FIG. 7 is a schematic diagram of a hardware structure of user equipment according to an embodiment of the present application.

The user equipment 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the user equipment 700 may further include a power supply (for example, a battery) that supplies power to the components. The power supply may be logically connected to the processor 710 by using a power management system, so as to implement functions such as charging management, discharging management, and power consumption management by using the power management system. The user equipment is not limited to the user equipment structure shown in FIG. 7. The user equipment may include more or fewer components than those shown in the figure, or combine some components, or have a different component arrangement. Details are not described herein.

The radio frequency unit 701 may also be referred to as the radio frequency front-end device, and the radio frequency front-end device receives a switch control instruction from the processor 710, where the switch control instruction is an instruction sent by the processor 710 to the radio frequency front-end device at a first moment; and the radio frequency front-end device performs on-off switching in response to the switch control instruction, where the first moment is a moment before a first time interval in a target subframe, and the first time interval is used to send an SRS.

Optionally, the radio frequency front-end device is further configured to receive the switch control instruction from the processor 710 at a second moment, where the second moment is within the first time interval.

Optionally, the second moment is a start moment corresponding to the first time interval.

Optionally, the target subframe includes M time-domain symbols, and the first time interval occupies N time-domain symbols in the M time-domain symbols;

the target subframe further includes P time-domain symbols, and the P time-domain symbols are located before the first time interval; Q time-domain symbols are included in a time period between the first moment and the start moment of the first time interval, M, N, P, and Q are all positive integers, and M≥N+P+Q; and the user equipment 700 further includes a counter, the switch control instruction is an instruction that the processor 710 sends to the radio frequency front-end device at the first moment after receiving a target message sent by the counter, and the target message is used to indicate that the counter starts counting at a start moment of the target subframe and completes counting of P−Q time domain symbols.

Optionally, the radio frequency front-end device includes L types of devices, and L is a positive integer; and the first moment is determined based on a target response duration, the target response duration is a longest response duration in the L response durations, and the L response durations are durations respectively required for the L types of devices to perform on-off switching.

In this embodiment of the present application, because the processor 710 sends the switch control instruction to the radio frequency front-end device at the first moment, and the first moment is a moment before the first time interval in the target subframe, while the first time interval is used to send an SRS, a proportion of the response time of the radio frequency front-end device in the first time interval for sending the SRS may be reduced, more time is used for sending the SRS, and the requirements on the response time of the radio frequency device are reduced.

It should be understood that, in the embodiments of the present application, the input unit 704 may include a graphics processing unit (Graphics Processing Unit, GPU) 7041 and a microphone 7042, and the graphics processing unit 7041 processes image data of a still picture or video obtained by an image capture apparatus (such as a camera) in a video capture mode or an image capture mode. The display unit 706 may include a display panel 7061, and the display panel 7061 may be configured in a form of a liquid crystal display, an organic light-emitting diode, or the like. The user input unit 707 includes a touch panel 7071 and another input device 7072. The touch panel 7071 is also referred to as a touch screen. The touch panel 7071 may include two parts: a touch detection apparatus and a touch controller. The another input device 7072 may include but is not limited to a physical keyboard, a function key (such as a volume control key or an on/off key), a trackball, a mouse, a joystick, and the like. Details are not described herein again. The memory 709 may be configured to store a software program and various data, which includes but is not limited to applications and operating systems. An application processor and a modem processor may be integrated into the processor 710. The application processor mainly processes an operating system, a user interface, an application, and the like. The modem processor mainly processes wireless communications. It can be understood that, alternatively, the modem processor may not be integrated into the processor 710.

An embodiment of the present application further provides a readable storage medium, where the readable storage medium stores a program or an instruction, and when the program or the instruction is executed by a processor, the processes of the foregoing method embodiments for controlling a radio frequency front-end device are implemented, and a same technical effect can be achieved. To avoid repetition, details are not described herein again.

The processor is a processor in the user equipment in the foregoing embodiments. The readable storage medium includes a computer-readable storage medium such as a read-only memory (Read-Only Memory, ROM), a random access memory (Random Access Memory, RAM), a magnetic disk, an optical disc, or the like.

An embodiment of the present application still provides a chip. The chip includes a processor and a communications interface, and the communications interface is coupled to the processor. The processor is configured to run a program or an instruction to implement the processes of the method embodiment for controlling a radio frequency front-end device, and a same technical effect can be achieved. To avoid repetition, details are not described herein again.

It should be understood that the chip mentioned in this embodiment of the present application may also be referred to as a system-level chip, a system chip, a system on chip, a system-on-a-chip chip, and the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the methods and apparatuses in the embodiments of the present application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

A person of ordinary skill in the art may recognize that, with reference to the examples described in the embodiments disclosed herein, units and algorithm steps may be implemented by electronic hardware or a combination of computer software and electronic hardware. Whether these functions are implemented by using hardware or software depends on the specific application and design constraints of the technical solution. A person skilled in the art may use different methods to implement the described functions for each particular application, but it should not be considered that the implementation goes beyond the scope of the present disclosure.

It may be clearly understood by a person skilled in the art that, for convenience and brevity of description, for a specific working process of the foregoing described system, apparatus, and unit, reference may be made to a corresponding process in the foregoing method embodiments, and details are not described herein again.

In the embodiments provided in the present application, it should be understood that the disclosed apparatus and method may be implemented in another manner. For example, the described apparatus embodiment is merely an example. For example, the unit division is merely logical function division. In actual implementation, there may be another division manner. For example, multiple units or components may be combined or integrated into another system, or some features may be ignored or not performed. In addition, the displayed or discussed mutual coupling or direct coupling or communication connection may be through some interfaces, indirect coupling or communication connection of the apparatus or unit, and may be in an electrical, mechanical, or another form.

The units described as separate parts may or may not be physically separate, and parts displayed as units may or may not be physical units, may be located in one place, or may be distributed on multiple network units. Some or all of the units may be selected based on an actual requirement to implement the objectives of the solutions in the embodiments.

In addition, functional units in the embodiments of the present disclosure may be integrated into one processing unit, or each of the units may exist alone physically, or two or more units are integrated into one unit.

Based on the descriptions of the foregoing implementation manners, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of the present application.

A person of ordinary skill in the art may understand that all or some of the processes in the foregoing method embodiments may be implemented by using a computer program to control related hardware. The program may be stored in a computer readable storage medium. When the program is executed, the processes in the foregoing method embodiments may be performed. The storage medium includes a magnetic disk, a compact disc, a read-only memory (Read-Only Memory, ROM), a random access memory (Random Access Memory, RAM), or the like.

It can be understood that the embodiments described in the present disclosure may be implemented by hardware, software, firmware, middleware, microcode, or a combination thereof. For hardware implementation, a module, a unit, a subunit, or the like may be implemented in one or more application specific integrated circuits (Application Specific Integrated Circuits, ASIC), a digital signal processor (Digital Signal Processor, DSP), a digital signal processing device (DSP Device, DSPD), a programmable logic device (Programmable Logic Device, PLD), a field-programmable gate array (Field-Programmable Gate Array, FPGA), a general purpose processor, a controller, a microcontroller, a microprocessor, another electronic unit configured to perform the functions described in the present disclosure, or a combination thereof.

For implementation with software, technologies described in the embodiments of the present disclosure may be implemented by executing functional modules (for example, a process and a function) in the embodiments of the present disclosure. A software code may be stored in the memory and executed by the processor. The memory may be implemented in the processor or outside the processor.

The embodiments of the present application are described above with reference to the accompanying drawings, but the present application is not limited to the foregoing specific implementation manners. The foregoing specific implementation manners are merely schematic instead of restrictive. Under enlightenment of the present application, a person of ordinary skills in the art may make many forms without departing from aims and the protection scope of claims of the present application, all of which fall within the protection scope of the present application.

The invention claimed is:

1. A method for controlling a radio frequency front-end device performed by user equipment, wherein the user equipment comprises a processor and the radio frequency front-end device, and the method comprises:
   receiving, by the radio frequency front-end device, a switch control instruction from the processor, wherein the switch control instruction is an instruction sent by the processor to the radio frequency front-end device at a first moment; and
   performing, by the radio frequency front-end device, on-off switching in response to the switch control instruction, wherein
   the first moment is a moment before a first time interval in a target subframe, and the first time interval is used to send a sounding reference signal (SRS);
   wherein the target subframe comprises M time-domain symbols, and the first time interval occupies N time-domain symbols in the M time-domain symbols;
   the target subframe further comprises P time-domain symbols, and the P time-domain symbols are located before the first time interval; Q time-domain symbols are comprised in a time period between the first moment and a start moment of the first time interval, M, N, P, and Q are all positive integers, and M≥(N+P+Q); and
   the user equipment further comprises a counter, the switch control instruction is an instruction that the processor sends to the radio frequency front-end device at the first moment after receiving a target message sent by the counter, and the target message is used to indicate that the counter starts counting at a start moment of the target subframe and competes counting of (P−Q) time domain symbols.

2. The method according to claim 1, wherein the radio frequency front-end device comprises L types of devices, and L is a positive integer; and
   the first moment is determined based on a target response duration, the target response duration is a longest response duration in L response durations, and the L response durations are durations respectively required for the L types of devices to perform the on-off switching.

3. A non-transitory readable storage medium, wherein the non-transitory readable storage medium stores a program or an Instruction, and the program or the instruction, when executed by a processor, causes user equipment to perform the following steps:
   receiving, by a radio frequency front-end device, a switch control instruction from the processor, wherein the switch control instruction is an instruction sent by the processor to the radio frequency front-end device at a first moment; and
   performing, by the radio frequency front-end device, on-off switching in response to the switch control instruction, wherein
   the first moment is a moment before a first time interval in a target subframe, and the first time interval is used to send a sounding reference signal (SRS);
   wherein the target subframe comprises M time-domain symbols, and the first time interval occupies N time-domain symbols in the M time-domain symbols;
   the target subframe further comprises P time-domain symbols, and the P time-domain symbols are located before the first time interval; Q time-domain symbols are comprised in a time period between the first moment and a start moment of the first time Interval, M, N, P, and Q are all positive integers, and M≥(N+P+Q); and
   the user equipment further comprises a counter, the switch control instruction is an instruction that the processor sends to the radio frequency front-end device at the first moment after receiving a target message sent by the counter, and the target message is used to indicate that the counter starts counting at a start moment of the target subframe and competes counting of (P−Q) time domain symbols.

4. The non-transitory readable storage medium according to claim 3, wherein the radio frequency front-end device comprises L types of devices, and L is a positive integer; and
   the first moment is determined based on a target response duration, the target response duration is a longest response duration in L response durations, and the L response durations are durations respectively required for the L types of devices to perform the on-off switching.

5. User equipment, comprising:
   a processor; and
   a memory storing a program or an instruction that is executable on the processor, wherein the program or the instruction, when executed by the processor, causes the user equipment to perform the following steps:
   receiving, by a radio frequency front-end device, a switch control instruction from the processor, wherein the switch control instruction is an instruction sent by the processor to the radio frequency front-end device at a first moment; and
   performing, by the radio frequency front-end device, on-off switching in response to the switch control instruction, wherein
   the first moment is a moment before a first time interval in a target subframe, and the first time interval is used to send a sounding reference signal (SRS);
   wherein the target subframe comprises M time-domain symbols, and the first time interval occupies N time-domain symbols in the M time-domain symbols;
   the target subframe further comprises P time-domain symbols, and the P time-domain symbols are located before the first time interval; Q time-domain symbols are comprised in a time period between the first moment and a start moment of the first time interval, M, N, P, and Q are all positive integers, and M≥(N+P+Q); and
   the user equipment further comprises a counter, the switch control instruction is an instruction that the processor sends to the radio frequency front-end device at the first moment after receiving a target message sent by the counter, and the target message is used to indicate that the counter starts counting at a start moment of the target subframe and competes counting of (P−Q) time domain symbols.

6. The user equipment according to claim 5, wherein the radio frequency front-end device comprises L types of devices, and L is a positive integer; and the first moment is determined based on a target response duration, the target response duration is a longest response duration in L response durations, and the L response durations are durations respectively required for the L types of devices to perform the on-off switching.

7. The method according to claim 1, wherein the receiving, by the radio frequency front-end device, the switch control instruction from the processor comprises: receiving, by the radio frequency front-end device, the switch control instruction from the processor at a second moment, wherein the second moment is within the first time interval.

8. The method according to claim 7, wherein the second moment is the start moment of the first time interval.

9. The non-transitory readable storage medium according to claim 3, wherein the receiving, by the radio frequency front-end device, the switch control instruction from the processor comprises: receiving, by the radio frequency front-end device, the switch control instruction from the processor at a second moment, wherein the second moment is within the first time interval.

10. The non-transitory readable storage medium according to claim 9, wherein the second moment is the start moment of the first time interval.

11. The user equipment according to claim 5, wherein the receiving, by the radio frequency front-end device, the switch control instruction from the processor comprises: receiving, by the radio frequency front-end device, the switch control instruction from the processor at a second moment, wherein the second moment is within the first time interval.

12. The user equipment according to claim 11, wherein the second moment is the start moment of the first time interval.

* * * * *